M. E. McVICKER.
CORN-PLANTER.

No. 185,771. Patented Dec. 26, 1876.

Witnesses.
W. A. Marion
John Stanley

Marion E. McVicker
by E. Thurlow his atty in fact

THE GRAPHIC CO. N.Y.

UNITED STATES PATENT OFFICE.

MARION E. McVICKER, OF LAWN RIDGE, ILLINOIS, ASSIGNOR OF ONE-HALF OF HIS RIGHT TO APOLLOS S. COOPER AND GEORGE W. COOPER, OF SAME PLACE.

IMPROVEMENT IN CORN-PLANTERS.

Specification forming part of Letters Patent No. 185,771, dated December 26, 1876; application filed October 31, 1876.

*To all whom it may concern:*

Be it known that I, MARION E. MCVICKER, of Lawn Ridge, in the county of Marshall, in the State of Illinois, have invented an Improvement in Corn Marking and Dropping Attachments to Corn-Planters; and do hereby declare that the following is a full, clear, and exact description thereof, reference being had to the annexed drawings, making a part of this specification, in which like letters of reference refer to like parts, and in which—

Figure 1:
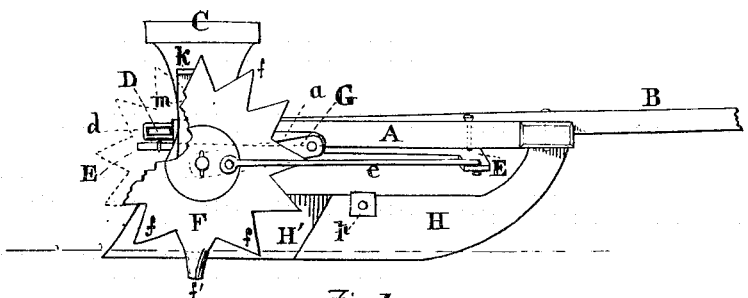
Figure 2:
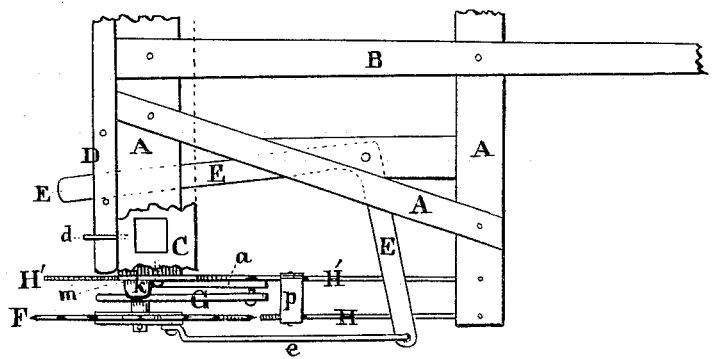
Figure 3:
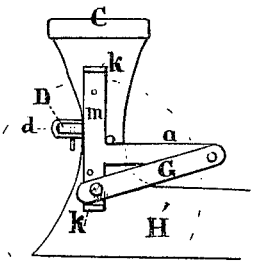

Figure 1 represents a side elevation of a planter with part of the marking-wheel removed to show the junction of the crank with the seed-dropping bar; Fig. 2, a plan or superficial view of same; Fig. 3, side elevation of same, with marking-wheel removed from its axle to show its pivotal arms, &c.

The object of this invention is to first make the marking-wheel rise and fall with the inequalities of the soil, and at the same time not to interfere with the regular movement of the wheel in operating the seed-dropping bar; second, to make the wheel oscillate the latter by means of connecting-rod, and horizontal crank, entirely out of the way of the operators of the machine; third, to divide clods or other obstructions in the course of the marking-wheel.

To carry out the first part of my invention I pivot the marking-wheel on a short pin to a rising and falling arm, pivoted, in turn, to the seed-box, or any convenient part of the frame, placing a lug or shoulder above and below to limit the play of said arm.

The second part of the invention I perform by connecting the transverse dropper-bar, by a slot or pins, with one arm of a double-armed crank pivoted horizontally to the under or upper surface of the frame of the planter, the other arm being connected by a rod with a crank-pin on the marking-wheel.

The third part of the invention is accomplished by attaching one or more colters, of the same shape as the fore part of the seed-runners, (in common use,) or a duplication of that portion of the same, in front of the wheel, extending backward parallel with the runner, on the outside of the latter, nearly to said wheel.

In the drawings, which represent one of the forms in which I construct this invention, A represents the frame of the planter (of a common form); B, the tongue; C, the seed-boxes fitted with any ordinary dropping-valves; D, the sliding dropping-bar, attached at either end to said valves, provided with a slot or pins, $d\ d$, to retain one of the arms of the horizontal crank E, which is pivoted at $b$ to under side of the frame A; but when the frame is low I prefer to place the crank on the upper side of said frame to avoid clods or obstructions. The other arm, which projects laterally, is united to the marker-wheel F by a connecting-rod, $e$, attached to a pin on the face of said wheel F. This wheel is provided with peripheral spurs $f$, one of which is weighted, $f'$, and formed with a broad end to mark the corn-row; and is weighted in order to start with this marking-spur perpendicular to the axle or pin of said wheel. G represents an oscillating arm, to the free end of which the marking-wheel is pivoted in a vertical line with the seed-runner and seed-box C, that the marking-spur $f'$ may be in the line of the planted seed. The forward end of this arm G is pivoted to a short arm, $a$, projecting parallel with same from a vertical head, $m$, terminating above and below in projecting shoulders $k\ k$, to control the limit of the motion of the arm G, and is secured to the seed-box or runners, or frame of the planter behind it. H' represents the ordinary seed-runner; H, the duplicate attached colter or repetition of the cutting-part of said runner H', fastened, at its rear upper edge, by means of a brace, $p$, to the adjacent edge of the seed-runner, and at its forward end to the beam, which holds the front end of said seed-runner, so as to be parallel with the same and in a line with the said marking-wheel.

The operation of this invention is as follows: The pivoted arm G, to which the marking-wheel is pivoted, allows the latter to follow the inequalities of the soil without interfering with the regularity of its operation upon the dropper crank E. The wheel is pivoted opposite to the seed-channels of the runners, and its weighted marker-spur $f'$ always starts the marking opposite the dropped seed by simply raising the arm G to allow the weight to set the wheel. Clods are divided or pushed aside from the course of the marking-wheel by means of the extra colter H, placed parallel with the seed-runners H', and easily attachable thereto, as well as are the crank E, wheel F, and arm $a$ to the body of a planter.

What I claim as my invention is—

1. The combination, with the sliding bar or seed-bar D, of a corn-planter, and with a marking-wheel mounted on an oscillating arm, G, of a horizontal elbow crank, E, connecting-rod $e$, substantially as and for the purposes described.

2. The combination, with a corn-planter having the marking-wheel F, and as an attachment thereto, of two or more colters, H, parallel with, and auxiliary to the cutting-part of the ordinary seed-runner, adapted to precede said marking-wheel, substantially as and for the purposes described.

3. The combination, with a corn or seed-planter, of the arms $a\,m$, provided with shoulders $k\,k$, oscillating wheel-arm G, and marking-wheel F, adapted, by means of rod $e$, to oscillate the crank E, and bar D, substantially as and for the purposes described.

In testimony that I claim the foregoing corn marking and dropping attachment to corn-planters, I have hereunto set my hand this 21st day of October, A. D. 1876.

MARION E. McVICKER.

Witnesses:
ELLIOT Z. ANDERSON,
JAMES M. MORSE.